(12) United States Patent
Sumimoto et al.

(10) Patent No.: US 6,316,919 B1
(45) Date of Patent: Nov. 13, 2001

(54) CONTROL DEVICE OF ALTERNATOR

(75) Inventors: Katsuyuki Sumimoto; Keiichi Komurasaki, both of Tokyo; Yasuaki Okamoto, Hyogo, all of (JP)

(73) Assignee: Mitsubishik Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/572,913

(22) Filed: May 17, 2000

(30) Foreign Application Priority Data

Nov. 11, 1999 (JP) ................................... 11-321464

(51) Int. Cl.$^7$ ........................................................ H02P 9/04
(52) U.S. Cl. .................................. 322/28; 322/36
(58) Field of Search ................................ 322/22, 23, 24, 322/25, 28, 36

(56) References Cited

U.S. PATENT DOCUMENTS

| | | | |
|---|---|---|---|
| 5,182,511 | * 1/1993 | Pierret et al. | 324/158 MG |
| 5,231,344 | * 7/1993 | Marumoto et al. | 322/14 |
| 5,256,959 | * 10/1993 | Nagano et al. | 322/25 |
| 5,608,309 | * 3/1997 | Hikita et al. | 322/28 |
| 5,637,985 | * 6/1997 | Kakizaki et al. | 322/28 |
| 5,754,030 | * 5/1998 | Maehara et al. | 322/19 |
| 5,760,486 | * 6/1998 | Uchinami et al. | 290/40 C |
| 5,923,151 | * 7/1999 | Satoh | 322/28 |

FOREIGN PATENT DOCUMENTS 5-176477    7/1993  (JP) .................................. H02J/7/16

\* cited by examiner

*Primary Examiner*—Nicholas Ponomarenko
(74) *Attorney, Agent, or Firm*—Sughrue, Mion, Zinn, Macpeak & Seas, PLLC

(57) ABSTRACT

There is provided a control device of an alternator in which the alternator is controlled to feedback-control a generated voltage to a target voltage without requiring change of parameters and equations of the control device due to change of the power generation characteristics or electromagnetic specification of the alternator, the electromagnetic specification of the alternator can be handled in a wide range without changing the specification of the control device, and its construction becomes easy. The control device includes an arithmetic portion for comparing a deviation with a predetermined value in response to the deviation of the generated voltage of the alternator from the target voltage, first and second convergence correction portions for converging the generated voltage of the alternator to the target voltage in response to the comparison result of the arithmetic portion, and a search proceeding portion and a search execution portion for searching an ON/OFF duty ratio of applied voltage to the alternator in response to the convergence result of the convergence correction portions and on the basis of a binary search method between a predetermined minimum duty ratio and a predetermined maximum duty ratio.

14 Claims, 5 Drawing Sheets

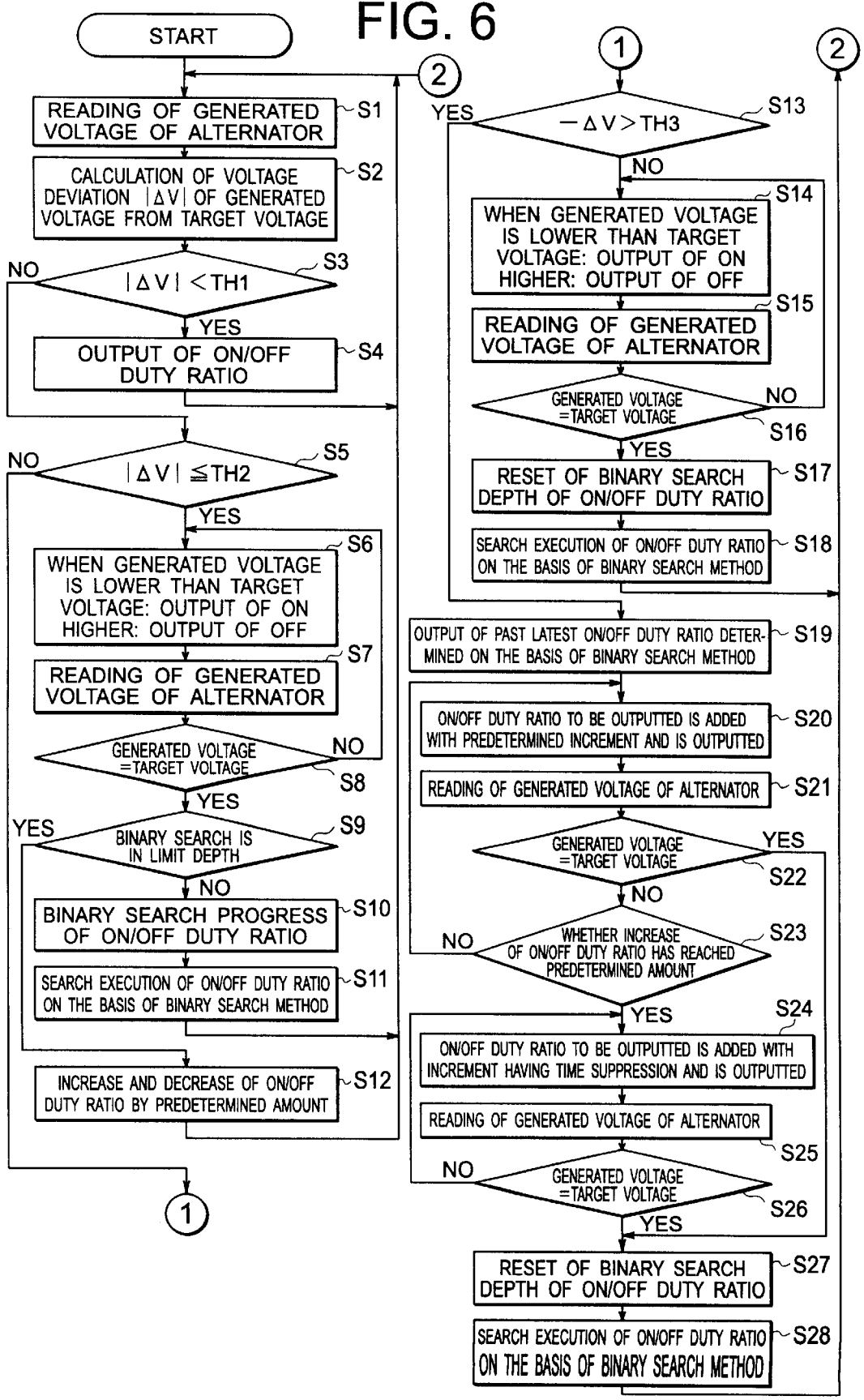

CONTROL DEVICE OF ALTERNATOR

BACKGROUND OF THE INVENTION

1. Field of the Invention

The present invention relates to a control device of an alternator, and particularly to a control device of an alternator, which controls a generated voltage of the alternator by an ON/OFF duty ratio of applied voltage to an exciting coil, and which is suitably used for, for example, a vehicle.

2. Description of the Related Art

Conventionally, with respect to feedback control of a generated voltage of an alternator to a target voltage, Japanese Patent Application Laid-open No. Hei 05-176477 discloses a control device of an alternator in which an attempt to achieve such control is made by means of digital control using a microcomputer.

In this kind of conventional control device of an alternator, in the case where feedback control is carried out by making a generated voltage of the alternator follow a target voltage, after a target exciting current corresponding to a target generating current of the alternator is calculated through an equation based on the power generation characteristics of the alternator, an estimated exciting current which may actually flow is calculated through an equation based on the electromagnetic specification of the alternator.

Then, the target exciting current based on a deviation of the value of the target exciting current obtained by this calculation from the value of the estimated exciting current is subjected to first order lead correction based on the power generation characteristics of the alternator and the electromagnetic specification (for example, number of turns of an exciting winding constituting the alternator, etc.), and a control exciting current is calculated.

Next, an ON/OFF duty ratio to the control exciting current determined by the calculation is selected and is read out from a memory including a table previously set on the basis of the electromagnetic specification of the alternator. On the basis of the ON/OFF duty ratio read out from this memory, an applied voltage to an exciting coil is controlled.

In the conventional control apparatus of an alternator constructed as described above, in the case where the power generation characteristics or electromagnetic specification of the alternator is changed or in the case where the control device is applied to an alternator having different electromagnetic specification and power generation characteristics, in the control device, it is necessary to change the table of the ON/OFF duty ratio to control the exciting current and the coefficients of calculation equations of the exciting current for every electromagnetic specification and power generation characteristics of the alternator, and to again take matching. Thus, there has been a problem that the correcting work is troublesome and it takes a long time.

SUMMARY OF THE INVENTION

The present invention has been made to overcome the foregoing problem, and an object of the invention is to provide a control device of an alternator which can easily cope with the case where the power generation characteristics or electromagnetic specification of an alternator is changed or the case where the control device is applied to an alternator having different electromagnetic specification and power generation characteristics.

According to one aspect of the present invention, in a control device of an alternator for controlling a generated voltage of the alternator based on an ON/OFF duty ratio of applied voltage to an exciting coil of the alternator, the control device comprises arithmetic means for comparing a deviation with a predetermined value in response to the deviation of the generated voltage of the alternator from a target voltage, correction means for converging the generated voltage of the alternator to the target voltage in response to a comparison result of the arithmetic means, and search means for searching an ON/OFF duty ratio of applied voltage to the alternator in response to a convergence result of the correction means and based on a binary search method between a predetermined minimum duty ratio and a predetermined maximum duty ratio.

In one form of the invention, the search means resets a search depth and again carries out a search from the first when some voltage deviation from the target voltage occurs in the generated voltage of the alternator during the search of the ON/OFF duty ratio of the applied voltage.

In another form of the invention, the search means is provided with a predetermined search depth limit, and an end of the search of the ON/OFF duty ratio by the binary search method is judged with the ON/OFF duty ratio determined by the search depth limit.

In a further form of the invention, the correction means makes fine adjustments to the ON/OFF duty ratio of the applied voltage by a predetermined increment and decrement when the binary search method in the search means reaches the predetermined search depth limit.

In a still further form of the invention, the correction means provides a predetermined time limit to a decrease amount of the ON/OFF duty ratio decreasing at the predetermined decrement, and suppresses the decrease amount temporally.

In a yet further form of the invention, the control device comprises addition means for adding a predetermined increment to the ON/OFF duty ratio of the applied voltage in response to the comparison result of the arithmetic means.

In a still another form of the invention, the addition means includes suppression means for providing a predetermined time limit to an increase amount of the ON/OFF duty ratio of the applied voltage increasing at the predetermined increment and for suppressing the increase amount temporally.

In a still another form of the invention, the suppression means releases or lessens the time suppression of the increase amount within a range of a predetermined increase amount.

In a still another form of the invention, the suppression means changes the increase amount per time according to the drive revolution speed of the alternator.

In a still another form of the invention, a temperature detecting element is provided inside the control device, and battery temperature is estimated on the basis of the inside temperature of the control device detected by the temperature detecting element.

BRIEF DESCRIPTION OF THE DRAWINGS

In the accompanying drawings:

FIG. 6 is a flowchart used for operating explanation in an embodiment of the invention.

DETAILED DESCRIPTION OF THE PREFERRED EMBODIMENTS

Preferred embodiments of the present invention will be described with reference to the drawings while using, as an example, a case where the invention is applied to, for example, a control device of a vehicle alternator.

Embodiment 1

Figure 1:
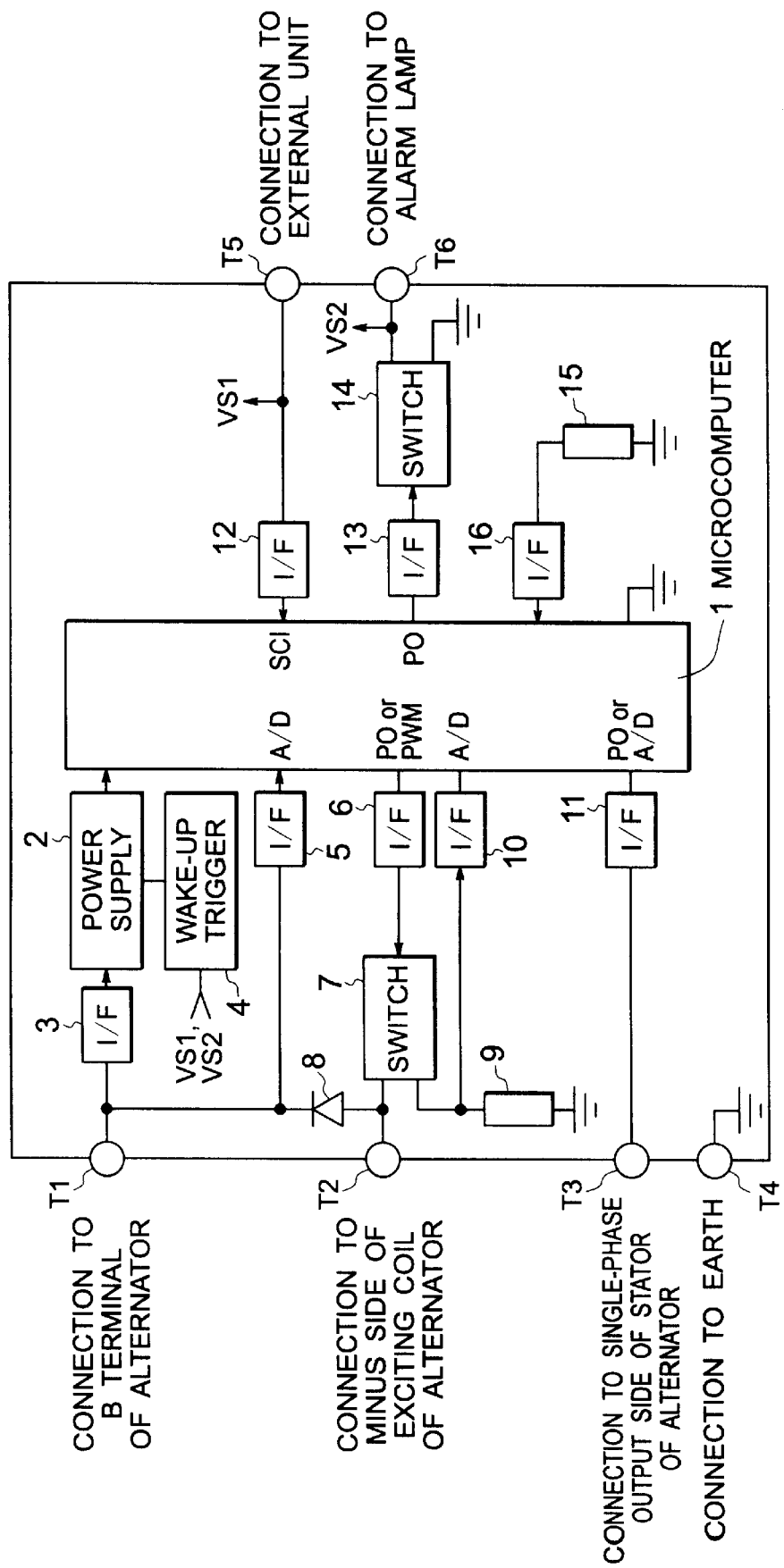
FIG. 1 is a structural view showing an embodiment of the invention.

FIG. 1 is a structural view showing a control device of an alternator according to embodiment 1 of the invention. In the drawing, the control device includes a microcomputer 1 and a plurality of terminals T1 to T6 connected to external units (not shown). The microcomputer 1 is exclusively used for control of power generation of an alternator or can be a case where it is included in the inside of an engine ECU. In the structure shown in FIG. 1, it is supposed that the control device of the alternator is built in the alternator or is set adjacent to the outside of the alternator.

In the case where the control function of the alternator is incorporated in the microcomputer of the engine ECU, since the engine ECU itself recognizes the engine revolution speed, it is not necessary to separately take the drive revolution speed of the alternator. However, in the case where the microcomputer is separate only for power generation control of the alternator and is further set at a different place, as long as an engine revolution signal line is not connected to an external unit such as an engine ECU, in the case where the alternator drive revolution speed or engine revolution speed is necessary for the control, it is necessary to take a voltage waveform of single-phase output of a stator of the alternator and to make conversion into the revolution speed.

The microcomputer 1 is supplied with a predetermined power supply voltage from a power supply 2, this power supply 2 is connected to the terminal T1 through an interface (I/F) 3, and this terminal T1 is connected to a B (power supply) terminal of the alternator (not shown). Besides, a battery (not shown) is also connected to this terminal T1.

Besides, a wake-up trigger 4 is connected to the power supply 2. The microcomputer 1 is not supplied with power when an ignition key (not shown) of a vehicle is in an OFF state. A trigger to start the microcomputer I is detected by the wake-up trigger 4. This wake-up trigger 4 monitors a voltage signal VS1 of the terminal T5 connected to an external unit or a voltage signal VS2 of the terminal T6 connected to an alarm lamp (not shown), and when the voltage signal VS1 or VS2 is changed from LOW to HIGH, the power supply 2 of the microcomputer 1 is turned on.

After starting, in order to achieve power generation control of the alternator, the microcomputer 1 takes the generated voltage of the alternator from the terminal T1 into an A/D conversion port through an interface (I/F) 5. This A/D conversion port is a port for recognizing the generated voltage of the alternator. The microcomputer 1 processes the generated voltage of the alternator taken from the A/D conversion port in a functional block of power generation control shown in FIG. 2 descried later.

A PO port or PWM port of the microcomputer 1 is connected to a control electrode of a switch 7 through an interface (I/F) 6. As this switch 7, a semiconductor switch element driven with current or voltage, for example, a MOSFET or a bipolar transistor is used. One of main electrodes of the switch 7 is connected to the terminal T2 and is connected to the terminal T1 through a diode 8 for surge absorption. The other main electrode is grounded through a resistor 9 and is connected to an A/D conversion port of the microcomputer 1 through an interface (I/F) 10.

The terminal T2 is connected to a minus side of an exciting coil of the alternator. The ON/OFF of applied voltage to the exciting coil of the alternator is carried out by driving the switch 7 through the interface 6 from the PO port or PWM port of the microcomputer 1. The microcomputer 1 outputs a pulse of so-called ON/OFF duty from the PO port or PWM port, and the interface 6 converts this into current or voltage to drive the switch 7. The resistor 9 is provided so that on the basis of, for example, its voltage drop, exciting current is estimated at a side of the microcomputer 1.

A PO port or A/D conversion port of the microcomputer 1 is connected to the terminal T3 through an interface (I/F) 11, and this terminal T3 is connected to a single-phase output side of a stator of the alternator. The terminal T4 is grounded.

The microcomputer 1 takes the single-phase voltage of the stator under power generation of the alternator through the interface 11 into the PO port. The waveform of the voltage approximates a rectangular wave, and by measuring its frequency, it is possible to obtain the drive revolution speed of the alternator and if necessary, the engine revolution speed by means of a circumstantial ratio of a pulley of the alternator to an engine crank pulley, that is, a pulley ratio.

There is a case where the port of the microcomputer 1 connected to the interface 11 becomes an A/D conversion port instead of the PO port according to control contents. For example, in the case where a power generation start or poor power generation of the alternator is recognized by obtaining the peak voltage of the voltage waveform from the terminal T3, the A/D conversion port is used.

Incidentally, a comparison circuit capable of judging a voltage level may be provided in the interface 11, and in this case, it is not necessary to recognize the voltage in the microcomputer 1, and accordingly, the port may be a normal port for judging only HIGH/LOW of a pulse, that is, the PO port.

The terminal T5 is connected to an SCI port of the microcomputer 1 through an interface (I/F) 12. A PO port of the microcomputer 1 is connected to a control electrode of a switch 14 through an interface (I/F) 13. Similarly to the switch 7, a semiconductor switch element driven by current or voltage, for example, a MOSFET or a bipolar transistor is used as this switch 14. One of main electrodes of the switch 14 is connected to the terminal T6 to which an alarm lamp (not shown) or the like is connected, and the other main electrode is grounded.

The switch 14 is driven to turn on the alarm lamp in the case where the microcomputer 1 judges it to be necessary. The switch 14 is driven at the time of, for example, poor power generation of the alternator judged by the microcomputer 1, and turns on the alarm lamp or the like to give the alarm to the outside.

A temperature detecting element 15 is connected to the microcomputer 1 through an interface (I/F) 16. The temperature detecting element 15 is, for example, a thermistor or a diode for detecting temperature of the inside of the control device, and the microcomputer 1 estimates battery temperature on the basis of the temperature detected by this temperature detecting element 15.

Figure 2:
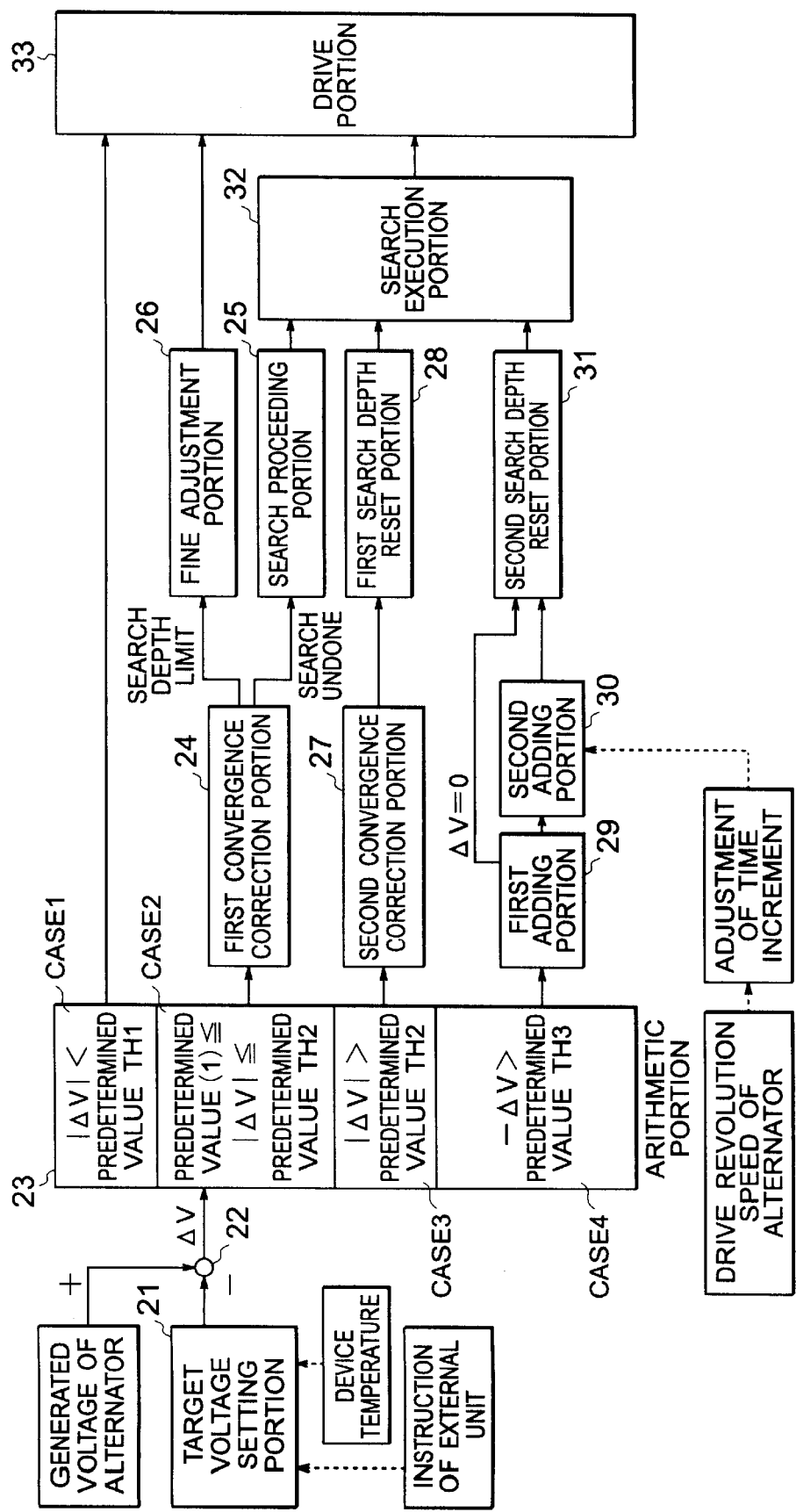
FIG. 2 is a block diagram functionally showing the main portion of an embodiment of the invention.

FIG. 2 is a block diagram for functionally showing power generation control of the alternator by the microcomputer 1.

Basic parameters necessary in this control method are a power generation voltage of the alternator and a target voltage, and a voltage deviation ΔV of those is feedback-controlled. A target voltage setting portion 21 may cause the device temperature detected by the temperature detecting element 15 as described above to be reflected in the target voltage or may change the target voltage according to instructions from the external unit such as the engine ECU connected to the terminal T5.

An adder 22 calculates the voltage deviation ΔV of the target voltage obtained from the target voltage setting portion 21 from the alternator generating voltage obtained at the A/D conversion port through the interface 5, and supplies it to an arithmetic portion 23. The arithmetic portion 23 divides the voltage deviation ΔV substantially obtained from the basic parameters into CASE 1 to CASE 4 according to its value and by the conditions shown in the drawing, and classifies the subsequent processing. Incidentally, the target voltage setting portion 21, the adder 22, and the arithmetic portion 23 constitute arithmetic means.

In the following explanation, predetermined values TH1, TH2 and TH3 substantially indicate reference values of the voltage deviation, and their magnitude relation is as follow:

$$TH1 \leq TH2 < TH3$$

CASE 1: When |ΔV| is less than the predetermined value TH1 That the absolute value |ΔV| of the voltage deviation ΔV is less than the predetermined value TH1 means that the voltage deviation is within a permissible range in view of voltage control. When the value |ΔV| is within the range of this voltage deviation, it is judged that an ON/OFF duty ratio of applied voltage to be outputted may be an already determined ON/OFF duty ratio, and its change is not made. Thus, in this case, the arithmetic portion 23 supplies the output directly to a drive portion 33, and by this, the switch 7 (FIG. 1) is driven.

Here, the already determined ON/OFF duty ratio is a duty ratio of applied voltage outputted last. However, since there is no conception of last output at the first time, some duty ratio is previously determined. If it is determined on the basis of a binary search method shown in FIG. 3, the initial ON/OFF duty ratio becomes 50%.

In general, the ON/OFF duty ratio of the alternator at the first time is an ON duty ratio to achieve a state called initial excitation, and if this is, for example, 20%, the initial ON duty ratio should be 20%. However, during the initial excitation state of the alternator, in general, the power generation voltage does not satisfy the target voltage, and in the case where the search of ON/OFF duty ratio described later is started, the ON duty ratio ought to increase, and there occurs a phenomenon where the initial excitation disappears during the initial excitation.

In order to avoid this, it is necessary that the ON/OFF duty ratio during the initial excitation of the alternator is determined with certain intention so that the search is not made. The certain intention here means to consider that it is fixed at 20%, it is not increased from 20% but is decreased, or improvement control of engine start properties called a start response (such control that at the start of an engine, exciting current is not made to flow so as to avoid power generation torque of the alternator, or restriction is made at a predetermined upper limit value) is made.

CASE 2: When |ΔV| is not less than the predetermined value TH1 and not larger than the predetermined value TH2

When the |ΔV| is not less than the predetermined value TH1, the ON/OFF duty ratio of a pulse outputted does not satisfy the exciting current required by the alternator, and it is necessary to change the ON/OFF duty ratio. Here, in a first convergence correction portion 24, if the ON/OFF duty ratio is changed on the basis of the binary search method shown in FIG. 3, the exciting current is finally converged to the ON/OFF duty ratio to be satisfied.

Although the control of power generation voltage of the alternator is achieved only by this, since increase/decrease of exciting current has a time constant and the outputted ON/OFF duty ratio of the applied voltage is not immediately reflected in the exciting current, in the case where the speed of duty change exceeds the time constant of the increase/decrease of the exciting current, the ON/OFF duty ratio comes to have an On ratio a little larger or smaller than expected.

Figure 4:
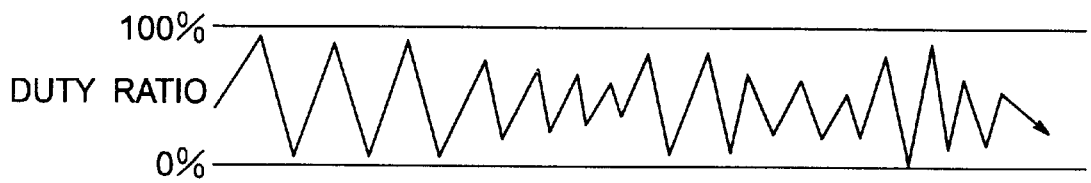
FIG. 4 is a view used for operating explanation in an embodiment of the invention.

Even if the overlarge or incommensurate value is tried to be corrected from that, the oversize or incommensurate value is always repeated and eventually, the exciting current does not become stable and the generated voltage of the alternator comes to fluctuate, and further, the ON/OFF duty ratio does not become stable. The manner of movement of the duty ratio in this case is shown in FIG. 4.

In this embodiment, means for improving this is incorporated at the same time, and before the duty ratio is changed on the basis of the binary search flow, the ON/OFF duty ratio with an ON ratio of 0% or 100% is continuously outputted to rapidly correct the exciting current so that the generated voltage becomes the target voltage. That is, when the generated voltage is less than the target voltage so that ΔV is minus, the ON ratio of 100% is continuously outputted, and when ΔV is plus, the ON ratio of 0% is continuously outputted. In the state of the exciting current raised by the rapid correction, the search of the duty ratio on the basis of the binary search flow proceeds at a search proceeding portion 25.

Figure 5:
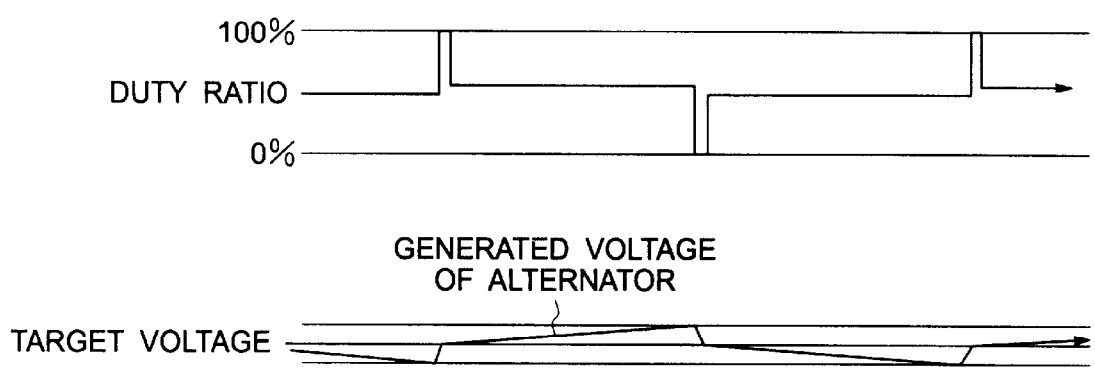
FIG. 5 is a view used for operating explanation in an embodiment of the invention.

Here, even if the search of the duty ratio is made, in the case where the search depth is in the limit, the determined duty ratio is finely adjusted by a predetermined increment and decrement in a fine adjustment portion 26. Here, the search depth means the depth directed from the leftmost end toward the right end in FIG. 3 such as a first column (50%), second column (75%, 25%), third column (87% . . . 12%), fourth column (93% . . . 7%), and fifth column (95% . . . 5%). In this case, the fifth column of the rightmost end indicates the limit of the search depth. FIG. 5 shows the manner of movement of the duty ratio achieved by the control described above and movement of the generated voltage of the alternator.

CASE 3: When |ΔV| exceeds the predetermined value TH2 (provided that in the case where ΔV is minus, it is less than the predetermined value TH3)

When |ΔV| exceeds the predetermined value TH2, it is judged that such a situation occurs that the exciting current is very high or quite low due to rapid increase/decrease of a vehicle load. Even in this case, the action of attempting to search the duty ratio on the basis of the binary search flow after the exciting current is rapidly corrected in a second convergence correction portion 27, is the same as the case of CASE 2.

However, a necessary exciting current of the alternator has been quite changed, that is, when the ON/OFF duty ratio is in the search process on the basis of the binary search flow, the end of convergence becomes incorrect before convergence. Even if this is neglected, it is finally converged to the ON/OFF duty ratio satisfying the necessary exciting current. However, here, by resetting the search depth of the binary search flow once in a first search depth reset portion 28 and again carrying out the search of the duty ratio, it becomes possible to improve the response of exciting current change to the rapid increase/decrease of the vehicle load.

Incidentally, the first convergence correction portion 24, the fine adjustment portion 26, and the second convergence correction portion 27 constitute correction means, and the search proceeding portion 25, the first search depth reset portion 28, and a search execution portion 32 constitutes search means.

CASE 4: When |ΔV| is minus and exceeds the predetermined value TH3

In a first adding portion 29, a kick on amount or dead band is made an initial increment without time suppression, and a predetermined increment is added to the ON/OFF duty ratio of applied voltage. By this, it becomes possible to improve voltage stability in the situation that an intermittent vehicle load (hazard lamp, etc.) called the kick on amount, dead band or the like is applied.

Here, when ΔV is minus and exceeds the predetermined value TH3, that is, in the case where the generated voltage is lower than the target voltage by more than the predetermined value, it is judged that rapid application of a vehicle load occurs. The difference from the CASE 3 is that even in the case of the rapid increase/decrease of the vehicle load, the subsequent processing is limited only in the direction of remarkable increase. In this situation, like the processing of the CASE 3, if the exciting current is immediately increased, the power generation drive torque of the alternator is rapidly increased, and rapid torque shock is given to the engine.

In order to avoid this, in this case, time suppression is applied to the increase of the ON/OFF duty ratio. That is, from the last ON/OFF duty ratio on the binary search flow, an increment restricted temporally is added in a second adding portion 30 until the target voltage is satisfied. Incidentally, the first adding portion 29 and the second adding portion 30 constitute addition means.

Similarly to the first search depth reset portion 28, a second search depth reset portion 31 resets the search depth of the binary search flow once, and again carries out the search of the duty ratio, so that it becomes possible to improve the response of exciting current change to the rapid increase/decrease of the vehicle load.

The search execution portion 32 carries out search execution on the basis of the output of the search proceeding portion 25, the first search depth reset portion 28, and the first search depth reset portion 31, and drives the drive portion 33.

Next, operation will be described with reference to FIG. 6.

First, the generated voltage of the alternator is read (step S1), and the voltage deviation ΔV of the generated voltage from the target voltage is calculated (step S2). Then, it is judged whether the absolute value |ΔV| of the voltage deviation ΔV is smaller than the predetermined value TH1 (step S3), and if smaller, since the voltage deviation is within a permissible range in view of voltage control, an ON/OFF duty ratio is not changed but a previously determined ON/OFF duty ratio is outputted (step S4). (CASE 1)

On the other hand, if |6 V| is larger than the predetermined value TH1, it is judged whether the |ΔV| is not larger than the predetermined value TH2 (step S5), and if not larger, that is, when |ΔV| is not less than the predetermined value TH1 and not larger than TH2, the outputted ON/OFF duty ratio of applied voltage does not satisfy the exciting current required by the alternator, and it is necessary to change the ON/OFF duty ratio.

Figure 3:
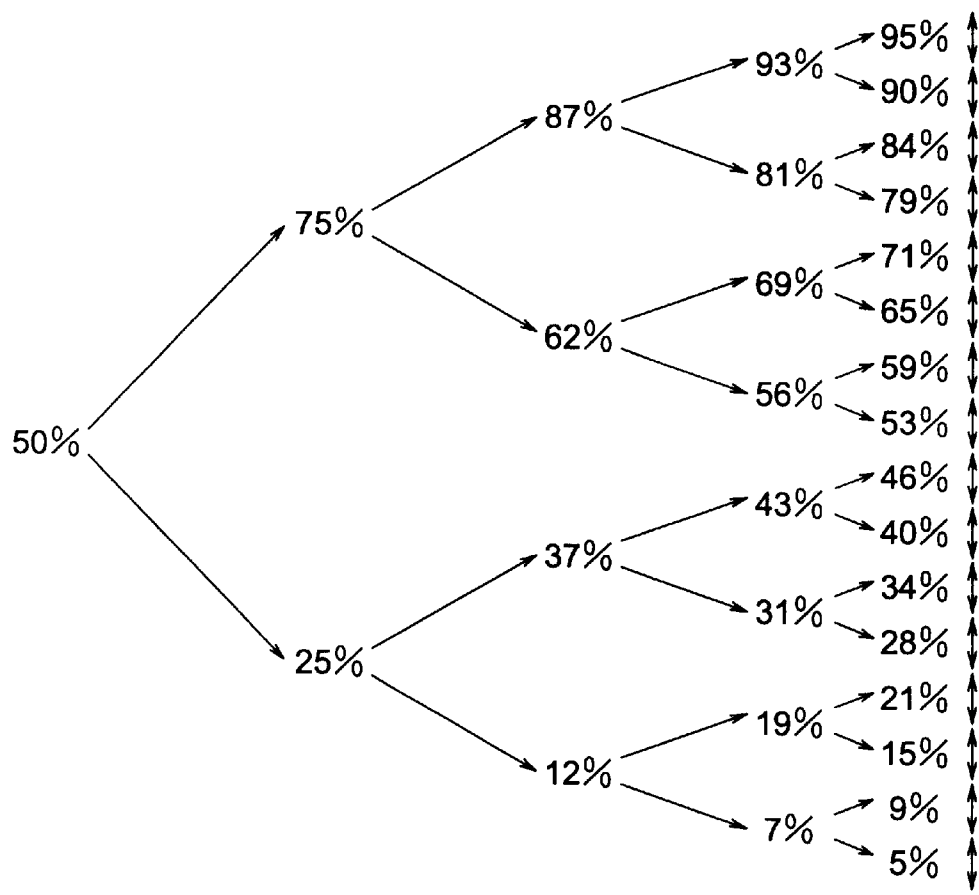
FIG. 3 is a view showing a binary search flow in an embodiment of the invention.

Here, if the ON/OFF duty ratio is changed on the basis of the binary search flow shown in FIG. 3, it is finally converged to the ON/OFF duty ratio which satisfies the exciting current. However, as described above, the increase/decrease of the exciting current has a time constant, and the outputted ON/OFF duty ratio of the applied voltage is not immediately reflected in the exciting current. Thus, if the speed of duty change exceeds the increase/decrease time constant of the exciting current, the ON/OFF duty ratio comes to have an On ratio a little larger or smaller than expected.

Then, before the duty ratio is changed on the basis of the binary search flow, the ON/OFF duty ratio with an ON ratio of 0% or 100% is continuously outputted to rapidly correct the exciting current so that the generated voltage becomes the target voltage.

That is, when the generated voltage is lower than the target voltage, the ON duty is outputted, and when higher, the OFF duty is outputted (step S6). The generated voltage of the alternator is read (step S7), and it is judged whether the generated voltage is equal to the target voltage (step S8). If not equal, the procedure returns to step S6 and the foregoing operation is repeated, and if becomes equal, the procedure proceeds to step S9.

Then, at step S9, it is judged whether the binary search is in the limit depth (search depth limit), and if not in the limit depth, the binary search proceeding of the ON/OFF duty ratio is carried out, that is, the search of the duty ratio on the basis of the binary search flow is made to proceed in the state of the exciting current raised by the rapid correction (step S10).

Subsequently, search execution of the ON/OFF duty ratio on the basis of the binary search method is carried out (step S11), and then, the procedure returns to step S1 and the foregoing operation is repeated.

On the other hand, if the binary search is in the limit depth at step S9, a predetermined amount is added to or subtracted from the ON/OFF duty ratio. That is, although the search of duty ratio is carried out, in the case where the search depth is in the limit, the determined duty ratio is finely adjusted by a predetermined increment and decrement (CASE 2).

At step S5, if |ΔV| is larger than the predetermined value TH2, it is judged whether a negative voltage deviation −ΔV is larger than the predetermined value TH3 (step S13), and if smaller, that is, V exceeds the predetermined value TH2, it is judged that such a situation occurs that the exciting current is very high or quite low due to rapid increase/decrease of a vehicle load. Even in this case, the action of attempting to search the duty ratio on the basis of the binary search flow after the exciting current is rapidly corrected, is the same as the case of CASE 2.

Then, before the duty ratio is changed on the basis of the binary search flow, the ON/OFF duty ratio with an ON ratio of 0% or 100% is continuously outputted to rapidly correct the exciting current so that the generated voltage becomes the target voltage.

That is, when the generated voltage is lower than the target voltage, the ON duty is outputted, and when higher, the OFF duty is outputted. The generated voltage of the alternator is read (step S15), and it is judged whether the generated voltage is equal to the target voltage (step S16). If not equal, the procedure returns to step S14 and the foregoing operation is repeated, and if becomes equal, the procedure proceeds to step S17.

Here, a necessary exciting current of the alternator has been quite changed, that is, when the ON/OFF duty ratio is in the search process on the basis of the binary search flow, the end of convergence becomes incorrect before convergence. Then, the binary search depth of the ON/OFF duty ratio is reset at step S17, and subsequently, search execution of the ON/OFF duty ratio on the basis of the binary search method is carried out (step S18), and then, the procedure proceeds to step S1 and the foregoing operation is repeated (CASE 3).

At step S13, when $-\Delta V$ is larger than the predetermined value TH3, and $\Delta V$ is minus and exceeds the predetermined value TH3, that is, in the case where the generated voltage is lower than the target voltage by more than the predetermined value, it is judged that rapid application of a vehicle load occurs. Then, the past latest ON/OFF duty ratio determined by the binary search is outputted (step S19), and the outputted ON/OFF duty ratio of applied voltage is added with a predetermined increment and is outputted (step S20). That is, at step S20, as described above, the kick on amount or dead band is made an initial increment without time suppression, and the predetermined increment is added to the ON/OFF duty ratio of the applied voltage.

Then, the generated voltage of the alternator is read (step S21), and it is judged whether the generated voltage is equal to the target voltage (step S22). If not equal, it is judged whether the increase of the ON/OFF duty ratio has reached a predetermined amount (step S23). If not reached, the procedure returns to step S20 and the foregoing operation is repeated, and if reached, the procedure proceeds to step S24.

At step S24, the ON/OFF duty ratio of applied voltage to be outputted is added with an increment with time suppression and is outputted. That is, as described above, if the exciting current is immediately increased like the processing of the CASE 3, the power generation drive torque of the alternator is rapidly increased, and rapid torque shock is given to the engine. In order to avoid this, the time suppression is applied to the increase of the ON/OFF duty ratio.

Next, the generated voltage of the alternator is read (step S26), and it is judged whether the generated voltage is equal to the target voltage (step S26), and if not equal, the procedure returns to step S24 and the foregoing operation is repeated. That is, from the last ON/OFF duty ratio on the binary search flow, an increment restricted temporally is added until the target voltage is satisfied. When the generated voltage of the alternator becomes equal to the target voltage, the procedure proceeds to step S27.

Here, the steps S19 to S26 are for the case where the increase amount of the ON/OFF duty ratio of applied voltage increasing by a predetermined increment is suppressed temporally, and this operation will be described in detail while using suitable numerical values as an example.

Now, it is assumed that an objective ON/OFF duty ratio of applied voltage is 50%, an ON/OFF duty ratio of applied voltage to be outputted at step S19 is 20%, a predetermined increment is 5%, a predetermined amount at step S23 is 30%, and an increment with time suppression at step S24 is 1%. At step S20, the predetermined amount 5% is added to the ON/OFF duty ratio of 20% from step S19, and this is repeated among steps S20 to S23 until the predetermined amount 30% at step S23 is achieved.

When the predetermined amount 30% is reached, that is, at the time point when repetition is made six times among steps S20 to S23, the objective ON/OFF duty ratio of applied voltage becomes 50%. However, since the generated voltage of the alternator does not reach the target voltage, the procedure proceeds to step S24.

Then, at step S24, an increment of 1% with time suppression is added to the ON/OFF duty ratio of applied voltage to be outputted, that is, the increase amount of the ON/OFF duty ratio is substantially suppressed temporally, and similar operation is repeated until the generated voltage of the alternator becomes the target voltage.

Then, at step S27, the binary search depth of the ON/OFF duty ratio is reset, and subsequently, the search execution of the ON/OFF duty ratio on the basis of the binary search method is carried out (step S28), and then, the procedure returns to step S1 and the foregoing operation is repeated. (CASE 4)

Like this, in this embodiment, the ON/OFF duty ratio is searched on the basis of the binary search method between a predetermined minimum duty ratio and a predetermined maximum duty ratio so that the generated voltage of the alternator is converged to the target voltage. Thus, in the case where the alternator is controlled and the generated voltage is feedback-controlled to the target voltage, the control device does not require parameters or equations based on the power generation characteristics or electromagnetic specification of the alternator.

That is, change of parameters or equations of the control device is not required by change of the power generation characteristics or electromagnetic specification of the alternator. Thus, the feedback control can be achieved without calculating the exciting current through the equation based on the power generation characteristics or electromagnetic specification of the alternator or without converting it into the ON/OFF duty ratio as in the prior art.

Besides, without changing the specification of the control device, it is possible to quickly handle the electromagnetic specification of the alternator in a wide range. In addition, since the ON/OFF duty ratio of applied voltage to the exciting coil is substantially determined by a fixed frequency, in the case where this is recognized by an electric circuit or a microcomputer, its construction becomes easy. As the recognizing means, for example, the construction of estimating the power generation torque of the alternator is conceivable.

Besides, when a predetermined voltage deviation from the target voltage occurs in the generated voltage of the alternator during the search of the ON/OFF duty ratio, the search depth is reset and the search is again carried out from the first. Thus, even if rapid application of an electrical load occurs, the generated voltage of the alternator can be quickly corrected.

Besides, since a predetermined search depth limit is provided, and the search end of the ON/OFF duty ratio by the binary search method is judged with the ON/OFF duty ratio determined by this search depth limit, it is possible to determine the ON/OFF duty ratio to estimate the power generation torque of the alternator.

Besides, when reaching the predetermined search depth limit, the ON/OFF duty ratio is finely adjusted by a predetermined increment and decrement, so that it is possible to improve the stability of generated voltage of the alternator.

Besides, since a predetermined time limit is provided to the increase amount of the ON/OFF duty ratio increasing by a predetermined increment and the increase amount is suppressed temporally, it is possible to prevent the rapid increase of the power generation torque of the alternator.

In order to prevent the rapid increase of the power generation torque of the alternator, the response of increase of the generated power of the alternator to the target power is intentionally made bad, and the response to an intermittent load such as a hazard lamp or a winker at a stop of a vehicle becomes bad, so that the light and darkness of a room lamp or a lamp in a meter causes an unpleasant feeling visually. In this case, within the range of a predetermined increase amount, the time suppression of the increase amount is released or is made small, or a predetermined time limit is provided to the decrease amount of the ON/OFF duty ratio decreasing by a predetermined decrement to suppress the decrease amount temporally. Thus, it is possible to remove or lessen the emergence of the foregoing visual unpleasant feeling.

Besides, at the time of suppression of the increase amount, the increase amount per time is changed according to the drive revolution speed of the alternator. Thus, when the power generation torque increases at the time of application of an electric load, a drop in the engine revolution can be made low when the engine revolution is low, and a drop in power generation voltage is made low when the engine revolution is high.

Besides, a temperature detecting element such as a thermistor is provided in the inside of the control device, and battery temperature is estimated on the basis of the inner temperature of the control device detected by this temperature detecting element. Thus, it is possible to prolong the life of the battery by charging voltage taking temperature characteristics of charging efficiency of the battery into consideration.

What is claimed is:

1. A control device of an alternator for controlling a generated voltage of the alternator based on an ON/OFF duty ratio of applied voltage to an exciting coil of the alternator, the control device comprising:

arithmetic means for comparing a deviation with a predetermined value in response to the deviation of the generated voltage of the alternator from a target voltage;

correction means for converging the generated voltage of the alternator to the target voltage in response to a comparison result of the arithmetic means; and search means for searching an ON/OFF duty ratio of applied voltage to the alternator in response to a convergence result of the correction means and based on a binary search method between a predetermined minimum duty ratio and a predetermined maximum duty ratio.

2. A control device of an alternator according to claim 1, wherein the search means resets a search depth and again carries out a search from the first when some voltage deviation from the target voltage occurs in the generated voltage of the alternator during the search of the ON/OFF duty ratio of the applied voltage.

3. A control device of an alternator according to claim 1, wherein the search means is provided with a predetermined search depth limit, and an end of the search of the ON/OFF duty ratio by the binary search method is judged with the ON/OFF duty ratio determined by the search depth limit.

4. A control device of an alternator according to claim 2, wherein the search means is provided with a predetermined search depth limit, and an end of the search of the ON/OFF duty ratio by the binary search method is judged with the ON/OFF duty ratio determined by the search depth limit.

5. A control device of an alternator according to claim 3, wherein the correction means makes fine adjustments to the ON/OFF duty ratio of the applied voltage by a predetermined increment and decrement when the binary search method in the search means reaches the predetermined search depth limit.

6. A control device of an alternator according to claim 4, wherein the correction means makes fine adjustments to the ON/OFF duty ratio of the applied voltage by a predetermined increment and decrement when the binary search method in the search means reaches the predetermined search depth limit.

7. A control device of an alternator according to claim 5, wherein the correction means provides a predetermined time limit to a decrease amount of the ON/OFF duty ratio decreasing at the predetermined decrement, and suppresses the decrease amount temporally.

8. A control device of an alternator according to claim 6, wherein the correction means provides a predetermined time limit to a decrease amount of the ON/OFF duty ratio decreasing at the predetermined decrement, and suppresses the decrease amount temporally.

9. A control device of an alternator according to claim 1, further comprising addition means for adding a predetermined increment to the ON/OFF duty ratio of the applied voltage in response to the comparison result of the arithmetic means.

10. A control device of an alternator according to claim 9, wherein the addition means includes suppression means for providing a predetermined time limit to an increase amount of the ON/OFF duty ratio of the applied voltage increasing at the predetermined increment and for suppressing the increase amount temporally.

11. A control device of an alternator according to claim 10, wherein the suppression means releases or lessens time suppression of the increase amount within a range of a predetermined increase amount.

12. A control device of an alternator according to claim 10, wherein the suppression means changes the increase amount per time by a drive revolution speed of the alternator.

13. A control device of an alternator according to claim 11, wherein the suppression means changes the increase amount per time by a drive revolution speed of the alternator.

14. A control device of an alternator according to claim 1, wherein a temperature detecting element is provided inside the control device, and battery temperature is estimated on the basis of inside temperature of the control device detected by the temperature detecting element.

* * * * *